United States Patent [19]

Tackett et al.

[11] Patent Number: 5,681,097
[45] Date of Patent: Oct. 28, 1997

[54] HYDRAULIC CONTROL UNIT FOR VEHICULAR ANTI-LOCK BRAKE AND TRACTION CONTROL SYSTEMS

[75] Inventors: Wendell Dean Tackett, Ann Arbor; Edward Nelson Fuller, Manchester, both of Mich.

[73] Assignee: Kelsey-Hayes Company, Livonia, Mich.

[21] Appl. No.: 511,973

[22] Filed: Aug. 7, 1995

Related U.S. Application Data

[63] Continuation-in-part of Ser. No. 198,365, Feb. 18, 1994, Pat. No. 5,439,279.

[51] Int. Cl.[6] .................................................. B60T 8/36
[52] U.S. Cl. .................. 303/119.2; 137/454.2; 251/129.02; 251/129.15
[58] Field of Search ................ 303/119.1, 119.2, 303/84.2; 137/454.2; 251/129.02, 129.15

[56] References Cited

U.S. PATENT DOCUMENTS

| 4,206,950 | 6/1980 | Elliott | 303/113.2 |
|---|---|---|---|
| 4,592,533 | 6/1986 | Guglielmi et al. | 251/129.15 |
| 4,828,335 | 5/1989 | Fuller et al. | 303/160 |
| 4,884,782 | 12/1989 | Hensely et al. | 251/129.15 |
| 4,987,923 | 1/1991 | Tackett | 303/119.2 X |
| 5,167,442 | 12/1992 | Alaze et al. | 303/113.2 |
| 5,267,785 | 12/1993 | Maisch | 303/119.2 |
| 5,333,946 | 8/1994 | Goosens et al. | 303/119.2 |
| 5,439,279 | 8/1995 | Linkner, Jr. et al. | 303/119.2 |

*Primary Examiner*—Josie Ballato
*Attorney, Agent, or Firm*—MacMillan, Sobanski & Todd

[57] ABSTRACT

A vehicular anti-lock brake system control unit having a control valve includes a housing with a control valve bore therein. The control valve includes a sleeve with a moveable armature, and a coil surrounding the sleeve for moving the armature. The control valve also includes a valve body having an outer end attached to the sleeve and an inner end seated within the control valve bore of the housing. The valve body has an outer diameter no greater than the outer diameter of the coil such that minimum spacing between multiple control valves in the control unit is not limited by the outer diameter of the valve body, a construction which is facilitated by constructing the flux ring as a component separate from the valve housing and, in one form, adapted to be a part of the coil assembly carried by a separate electric control module.

9 Claims, 7 Drawing Sheets

FIG 4
PRIOR ART
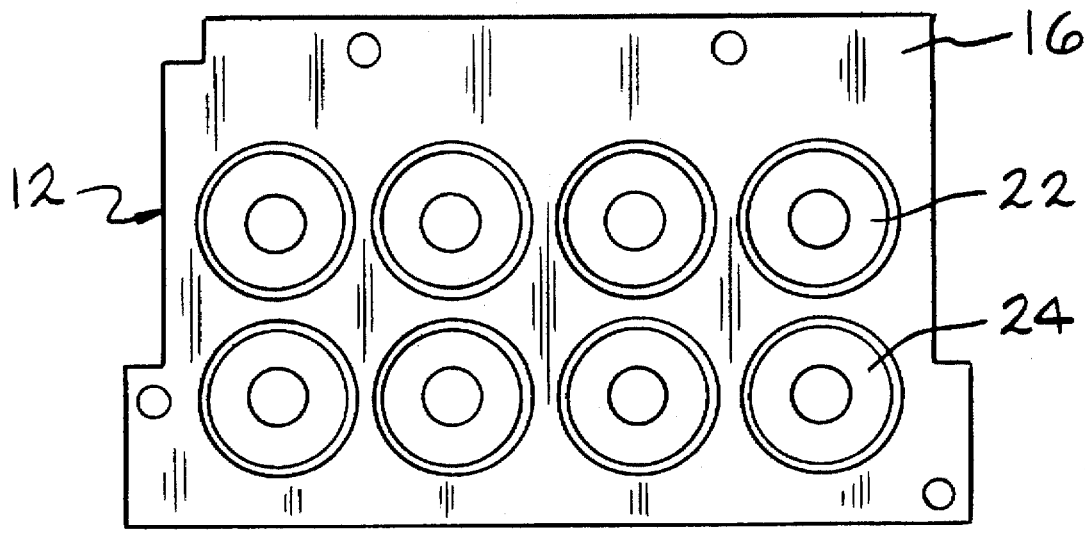
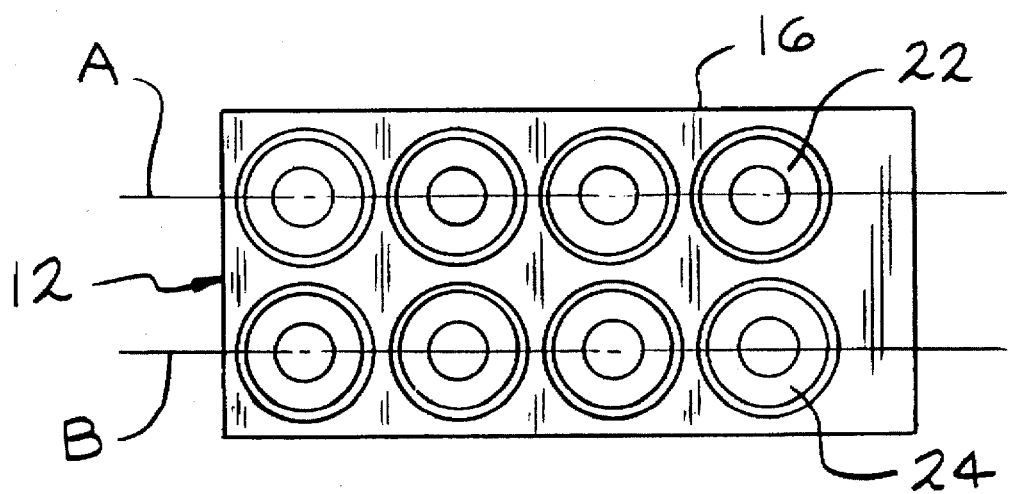
FIG. 5

HYDRAULIC CONTROL UNIT FOR VEHICULAR ANTI-LOCK BRAKE AND TRACTION CONTROL SYSTEMS

CROSS-REFERENCE TO RELATED APPLICATION

This application is a continuation-in-part of United States Application Serial No. 08/198,365, filed Feb. 18, 1994, entitled "Vehicular Anti-Lock Brake System Hydraulic Control Unit", now U.S. Pat. No. 5,439,279.

TECHNICAL FIELD

This invention relates to anti-lock brake system hydraulic control units, particularly for vehicular applications, and more particularly concerning the design of solenoid actuated valve units and the manner in which they are assembled to the hydraulic control unit.

BACKGROUND ART

Many of the automobiles being produced today are equipped with a hydraulic brake system including an anti-lock brake subsystem for assuring that the vehicle wheels do not lock up during sudden applications of the brake. The anti-lock brake system (ABS) is considered by many to be the most significant improvement in vehicle safety within the last decade and it is presently being offered as standard equipment in many vehicles.

Most types of ABS include a singular hydraulic control unit, usually in the form of an aluminum block, in which there is incorporated all of the componentry necessary to provide the anti-lock braking function to the braking system. This includes solenoid actuated isolation valves for isolating a particular wheel brake from braking force exerted through the brake pedal and master cylinder. It also includes solenoid actuated hold/dump valves which are opened to relieve braking pressure at each of the wheel brakes thereby allowing the brake to relax its hold on the wheel. It further includes several low pressure accumulators and a pump for providing supplemental brake pressure to the wheels during the period of controlled braking.

All of this componentry is located in a single control unit, which is typically an aluminum block bored as required to receive the components and to provide fluid communication between the valves, accumulators and pump to complete the hydraulic circuitry. Consequently, the control unit can be of considerable size. For weight reasons, and perhaps more importantly for packaging reasons, it is desirable to maintain this size to an absolute minimum. Heretofore, a substantial amount of space has been required for the block because of the manner in which the solenoid actuated isolation valves and hold/dump valves are secured to the block as well as the manner in which the solenoid part of the valves mates with the electrical control portion of the control unit.

For example, as shown in U.S. Pat. No. 4,828,335, assigned to the assignee of the present invention, each of the isolation valves, dump valves, and accumulators are provided with an externally threaded portion for cooperation with the internally threaded bores of the control unit. For assistance in threading the components into the control unit, the isolation valves, dump valves, and accumulators each include a head having a radially enlarged flange shaped to receive a socket wrench or the like. Thus, the spacing of one valve from the other must be sufficient to accommodate the radial extent of the flange and reception of the socket wrench for the valve's installation into the control unit. This in turn increases the surface area required for the wall of the control unit from which the valves extend, and consequently the overall size of the control unit is increased.

Another factor contributing to the size of the control unit is the fact that the steel casing adapted to slide over the solenoid sleeve and associated coil has heretofore been constructed to be secured to the valve body prior to its installation in the control unit and prior to the electrical control module being fitted over the solenoid sleeves as part of the final assembly process. As shown in the above-referenced U.S. Patent, the casing can be crimped to the valve body portion. It is also known to eliminate the crimping operation and allow the casing to be slip fit over the outer body portion of the valve, either singly or as a part of the electrical control module, since in either case the casing will be in physical contact with the flux ring portion of the valve body.

It is also known to eliminate the socket wrench driving construction of the valve body head to include two diametrically opposed pin holes on the outboard side of the flux ring portion of the valve body thereby allowing the use of a spanner wrench to drive the threaded valve body home within the control unit.

SUMMARY OF THE INVENTION

The present invention contemplates constructing a control valve for a vehicle anti-lock brake control unit in such a manner that the control valve can be installed in the control unit occupying a minimum surface area on the wall of the control unit from which it extends thereby minimizing the overall size of the control unit.

The invention further contemplates a control valve construction as above described wherein the valve body is provided with a retaining flange to be received within a control valve bore within the control unit, the retaining flange facilitating retaining the valve body in the control unit housing bore by various non-threaded means, including a circular snap ring.

The invention further contemplates a control valve as above described wherein the flux ring portion of the valve body is constructed as a separate annular ring member thereby allowing the control unit housing to be of minimum diameter and thereby reducing the overall spacing requirements for the control valve within the control unit.

The invention further contemplates a solenoid actuated hydraulic control valve as above described wherein the separate annular flux ring is constructed in sub-combination with the casing and coil of an associated electronic control module thereby allowing the sub-assembly to be fitted over the solenoid sleeve of each control valve and an associated reduced diameter portion of the valve body as part of the final assembly of the control unit.

The invention further contemplates a control valve for a vehicle anti-lock brake system control unit having a control valve bore, wherein the control valve comprises a sleeve having a moveable armature therein, a coil surrounding the sleeve for moving the armature, the coil having an inner diameter and an outer diameter, and a valve body having an inner and an outer end, the outer end being attached to the sleeve to provide a sleeve assembly and the inner end seated within the control valve bore of the housing, the valve body having an outer diameter no greater than the outer diameter of the coil such that minimum spacing between multiple control valves in the control unit is not limited solely by the outer diameter of the valve body, a flux ring as a separate element surrounding and being in sliding engagement with the sleeve assembly at a position on or at least near the outer end of the valve body and a casing for securing the coil about the sleeve assembly, the casing being either attached to or in sliding engagement with the flux ring.

The invention also contemplates a vehicle anti-lock control unit including a valve body housing having a plurality of solenoid activated hydraulic control valves received therein, and an electric control module fitted and secured to the housing and having integrated therein the casing and coil components of the control solenoids, and preferably including a separate flux ring secured to each respective casing to thereby retain the coil and allow the respective casing/coil/flux ring subunits to be slidably received over a reduced diameter outer portion of the valve body.

These and other objects and advantages will be readily apparent upon consideration of the following description and drawings.

BRIEF DESCRIPTION OF THE DRAWING

FIGS. 4 and 5 are plan views of a hydraulic control unit with associated control valves as constructed in accordance with the prior art and with the present invention, respectively, thus providing a visual comparison of the dramatic reduction in overall size of the hydraulic control unit as constructed in accordance with the present invention;

BEST MODE FOR CARRYING OUT THE INVENTION

Figure 1:
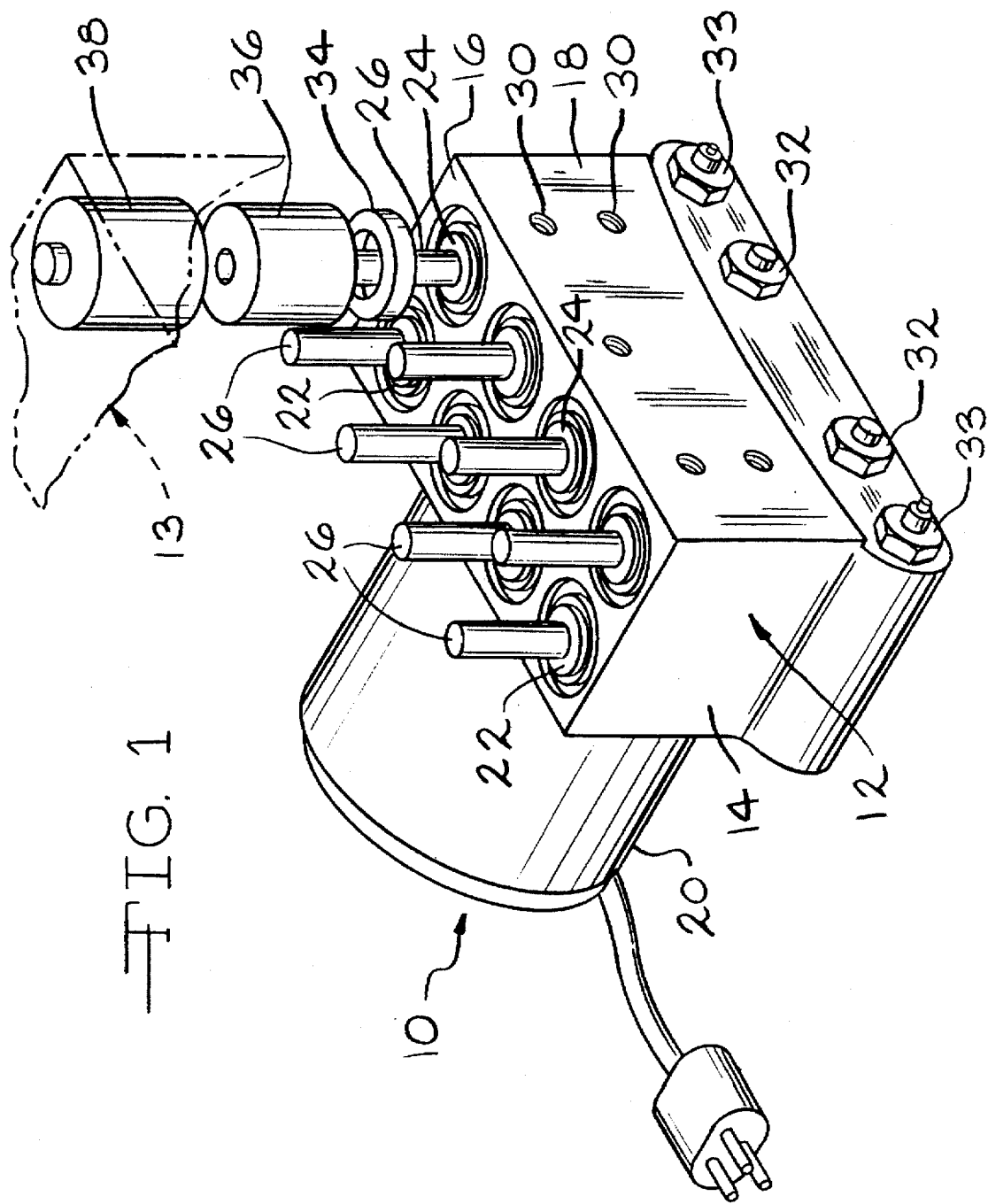
FIG. 1 is an overall exploded perspective view partially in cross-section showing a hydraulic control unit and associated electronic control module as constructed in accordance with the present invention.

Referring now to FIG. 1, a hydraulic control unit constructed in accordance with the present invention is shown, designated generally by reference numeral 10. The control unit (10) includes a valve body housing generally designated (12) having a plurality of walls (14,16,18). It also includes an electrical control module (or CIM) generally designated (13) to be secured to the housing (12) in final assembly.

Extending from one wall (14) of the housing (12) is an electrically driven pump (20), for providing supplemental brake pressure to the wheels during controlled braking. Extending from another wall (16) is a plurality of solenoid actuated isolation valves (22) and hold/dump valves (24), generally one each for each wheel of the vehicle, and each aligned along a respective axis A,B (marked only in FIG. 5) for controlling the brake fluid pressure applied to each wheel brake. As shown in FIG. 1, only a solenoid sleeve (26) and a portion of the valve body of each solenoid actuated isolation valve (22) and hold/dump valve (24) are visible. Each sleeve (26) is in axial alignment with the remainder of the associated valve located within the housing (12).

Extending from yet another wall (18) of the housing (12) is a plurality of brake lines (30) for transmitting brake fluid in the hydraulic brake circuity. Brake lines (30) lead to either the slave brake cylinders (not shown) of each wheel or the master brake cylinder (not shown). Extending from this same wall (18) are several low pressure accumulators (32) and pilot valves (33), the function of each being well known in ABS systems.

FIG. 1 also shows only one of a plurality of flux rings (34), coils (36), casings (38), molded within the electrical control module (13). The control module (13) is adapted to receive the casings (38), which in turn are adapted to receive the coils (36) and flux rings (34). The flux rings (34), coils (36), casings (38) and control module (13) together form a sub-assembly for placement over the respective sleeves (26) of the solenoid actuated isolation valves (22) and hold/dump valves (24) after the isolation and hold/dump valves (22,24) have been installed in the housing (12) of the control unit.

Figure 2:
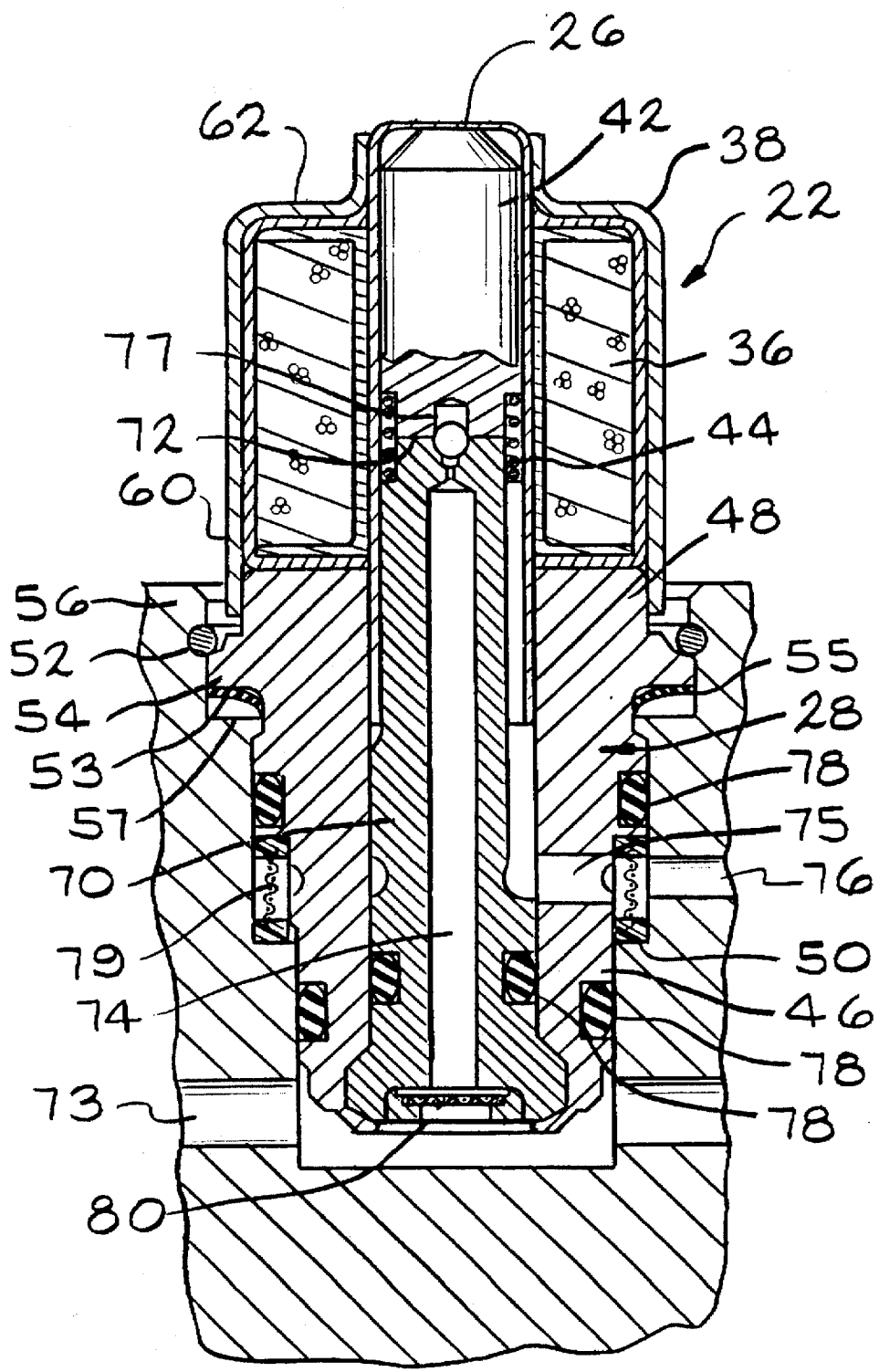
FIG. 2 is an elevation view in full cross-section showing a hydraulic control unit and associated control valve, in the form of an isolation valve, as constructed in accordance with a first embodiment of the present invention.

Referring now to FIG. 2, a first embodiment of a control valve of the present invention is shown. The control valve depicted in FIG. 2 is a solenoid actuated isolation valve (22). It should be noted, however, that the various embodiments of the present invention as described below are equally applicable to the solenoid actuated hold/dump valves (24) discussed above.

In this embodiment, the normally open isolation valve (22) comprises a cylindrical sleeve (26) having a movable armature (42) slidably received therein. The control valve (22) further comprises an annular coil (36) surrounding the sleeve (26). As is well known in the art, the coil (36) is energized with an electric current, which in turn sets up a magnetic field for moving the armature (42) against a biasing spring (44), closing off fluid flow through passages (73–76) by seating the integral armature ball valve (77) onto the valve seat (72) of valve stem (70) at the end of flow passage (74).

The isolation valve (22) further comprises a valve body (28) having an inner end (46) and outer end (48). The outer end (48) of the valve body (28) is attached to the sleeve (26), while the inner end (46) of the valve body (28) is seated within a bore (50) formed in the valve body housing (12). The outer end (48) of the valve body (28) may be attached to the sleeve (26) by a brazing process, but other forms of attachment may also be used.

The isolation valve (22) of this embodiment further comprises a snap ring (52) for securing the inner end (46) of the valve body (28) within the bore (50) of the housing (12). Snap ring (52) is preferably an annular ring having a circular cross-section. As seen in FIG. 2, the valve body (28) and the bore (50) each include a retaining flange (54,56) in the form of a shoulder formed therein. The respective retaining flanges (54,56) of the valve body (28) and the bore (50) are reciprocal and cooperate to receive the snap ring (52). A wave washer (53) seated within counterbore (55) on shoulder (57) serves to bias the retaining flange (54) against the snap ring.

Flow is restricted to flow passages (73–76) by O-ring seals (78). Annular filter (79) and disc-type filter (80) assist in precluding the possibility of particulates appearing in flow passages (74) and (75).

The isolation valve (22) further comprises a casing (38) having an open end (60) and a substantially closed end (62).

The open end (60) of the casing (38) is adapted to receive the coil (36) and is attached to the outer end (48) of the valve body (28). As shown in FIG. 2, such attachment is preferably a slip fit. This arrangement, as with the embodiment of FIG. 3, allows that the casing (38) may be integrated with the coil integrated module (CIM) or electric control module (13) (FIG. 1), i.e., molded in place as a single unit. Thereafter, as a final assembly step the CIM (13) is fitted onto control unit housing (12) with each of the respective casing/coil units being slidably received over the respective sleeves (26) and with the casing (38) making sliding contact at its open end with the respective control valve body (28).

Another construction, this one being known to the art, is to provide the outer end (48) of the valve body (28) with an annular groove (not shown) into which the open end (60) of the casing (38) may be crimped. With either arrangement, the casing (38) serves to secure the coil (36) about the sleeve (26). To enhance the magnetic field set up by the electrically energized coil (36), the casing (38) and valve body (28) are preferably constructed from a ferrous material, such as steel.

Figure 3:
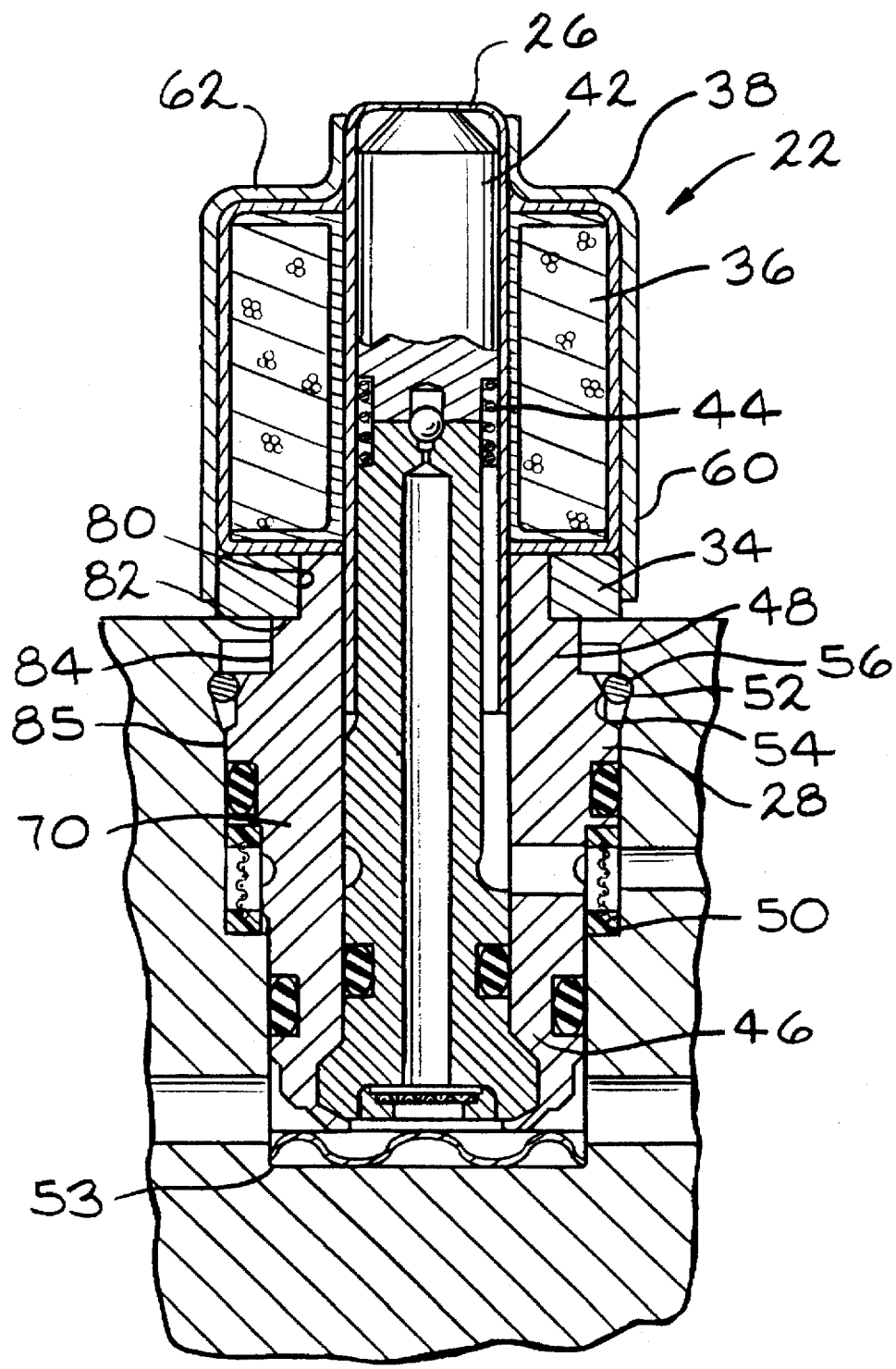
FIG. 3 is an elevation view in full cross-section showing a hydraulic control unit and associated solenoid actuated hydraulic control valve, in the form of an isolation valve, as constructed in accordance with a second embodiment of the present invention.

Referring now to FIG. 3, a second embodiment of a control valve of the present invention is shown. In this embodiment, the isolation valve (22) once again comprises a sleeve (26) having a movable armature (42) therein, an electrically energizable coil (36) surrounding the sleeve (26) for moving the armature (42) against a biasing spring (44), and a valve body (28) having an inner end (46) and outer end (48).

The inner end (46) of the valve body (28) is again seated within a control valve bore (50) formed in the valve body housing (12), while the outer end (48) is again attached to the sleeve (26). However, the valve body (28) of this embodiment has a smaller outer diameter relative to that of the valve body (28) of the embodiment shown in FIG. 2. More specifically, the valve body (28) of this embodiment has an outer diameter less than or equal to the outer diameter of the coil (36). As will be explained in greater detail below, this reduced outer diameter valve body (28) contributes to an overall reduction in size of the control unit (10).

The isolation valve (22) of this embodiment once again includes a snap ring (52) for securing the inner end (46) of the valve body (28) within the bore (50) of the housing (12). However, since the outer diameter of the valve body (28) has been reduced in this embodiment, the diameters of the bore (50) and snap ring (52) are likewise reduced. Moreover, the valve body (28) and the bore (50) again each include a retaining flange (54, 56) in the form of a shoulder formed therein. The respective retaining flanges (54, 56) of the valve body (28) and the bore (50) are reciprocal and cooperate to receive the snap ring (52). A wave washer (53) seated at the bottom of the main bore of the housing and bearing against the head of the valve stem (70) serves to bias the valve against the snap ring (52).

Still referring to FIG. 3, this isolation valve (22) once again comprises a casing (38) having an open end (60) and a substantially closed end (62). In this embodiment, however, the outer diameter of the outer end (48) of the valve body (28) is reduced relative to the outer diameter of the remainder of the valve body (28). This reduced diameter portion is shown as annular land (80). The land (80) terminates at a radial shoulder (82) which terminates at a second annular land (84), the diameter of which is less than the maximum diameter portion (85) of the lower end (46) of the valve body (28). Thus, in this embodiment, the retaining flange (54) is formed at the junction of the reduced diameter portion constituting second annular land (84) with the outer extremities of the lower end of the valve body. This is in contrast to the embodiment of FIG. 2 wherein the retaining flange 54 radially extends beyond the maximum diameter of the valve body lower end (46) and thus requires a substantially enlarged counterbore (55) to secure the valve to the control unit.

A separate flux ring (34) is provided having an inner diameter sized to be slidably received onto the reduced diameter portion (82) of the outer end (48) of the valve body (28). The flux ring rests on shoulder (82). It is separately installed onto the valve body once the valve body is secured in place via snap-ring (52) within the housing (12). Preferably, the casing (38), coil (36) and the flux ring (34) will be constructed as a single unit and integrated with the CIM, as with the embodiment of FIG. 2. For example, the flux ring (34) may be held to the casing by crimping as described earlier. In such a fashion, the coil (36) is held within the casing (38) between the substantially closed end (62) of the casing (38) and the flux ring (34), and as in the previous embodiment, the casing (38) (and coil 36 and flux ring 34) may be slip-fitted onto the sleeve (26).

Alternatively, the flux ring (34) can remain a separate part to be slip-fitted (or secured) onto the control valve (28) following securement of the control valve into the housing (12), with the casing/coil unit thereafter being slip-fitted onto the sleeve (26) and flux ring. To allow this construction it will be noted from FIG. 3 that the outer diameter of flux ring (34) is no greater than the outer diameter of the coil (36) and inner diameter of casing (38) at its open end (60).

Once again, to enhance the magnetic field set up by the electrically energized coil (36), the flux ring (34), casing (38) and valve body (28) are preferably constructed from a ferrous material, such as steel.

As previously described, the flux ring (34), coil (36), and casing (38) preferably form a sub-assembly with the electrical control module (13) (see FIG. 1) for placement over the sleeve (26) of the isolation valve (22). The construction of such a sub-assembly is facilitated by the use of the flux ring (34) which, as also previously described, serves to hold the coil (36) within the casing (38). Additional design details of the control valve and its operation may be found in U.S. Pat. No. 4,828,335, assigned to the assignee of the present invention, which is incorporated herein by reference for such further description.

Referring now to FIGS. 4 and 5, the respective plan views show a valve body housing (12) with associated isolation valves (22) and hold/dump valves (24) as constructed in accordance with the prior art and present invention, as constructed in the embodiment of FIG. 3. These Figures thus provide a visual comparison of the dramatic reduction in overall size of the hydraulic control unit (10) as constructed in accordance with the second embodiment of the present invention. In one specific application, the surface area of the control unit wall (16) depicted in FIG. 5 was reduced 22% from 11.1 square inches to 8.7 square inches, with each unit including four isolation valves (22) and four hold/dump valves (24). Each of the valves (22); (24) are received within a respective bore, the center lines of which are aligned along a common axis A,B, respectively, extending across the common wall shown.

The embodiment of FIG. 2 offers less advantage in reducing the overall size of the control unit, and in some cases may offer no size advantage dependent upon the manner in which the prior art devices are to be secured within the housing.

As seen in FIG. 5, the previously described reductions in the diameters of the valve body (28), bore (50), and snap ring (52) allow multiple solenoid actuated control valves (22),(24) to be spaced closer together in the valve body housing (12) of the control unit (10). More particularly, by limiting the outer diameter of each valve body (28) to a size no greater than the outer diameter of the coils (36), the spacing of multiple valves (22),(24) in the housing (12) is no longer limited by the outside diameter of the valve bodies (28).

Instead, the spacing of multiple control valves (22),(24) in the housing (12) is now limited by the outside diameter of the coils (36) or, more particularly, by the outside diameter of the casings (38), as well as the physical properties of the material, typically aluminum, chosen for the valve body housing (12) of the control unit (10). The present invention thus provides a control valve for a vehicle anti-lock brake control unit (10) that can be installed in the control unit housing (12) occupying a minimum surface area on the wall (16) of the housing (12) from which the control valves (22), (24) extend, thereby minimizing the overall size of the control unit (10).

Figure 6:
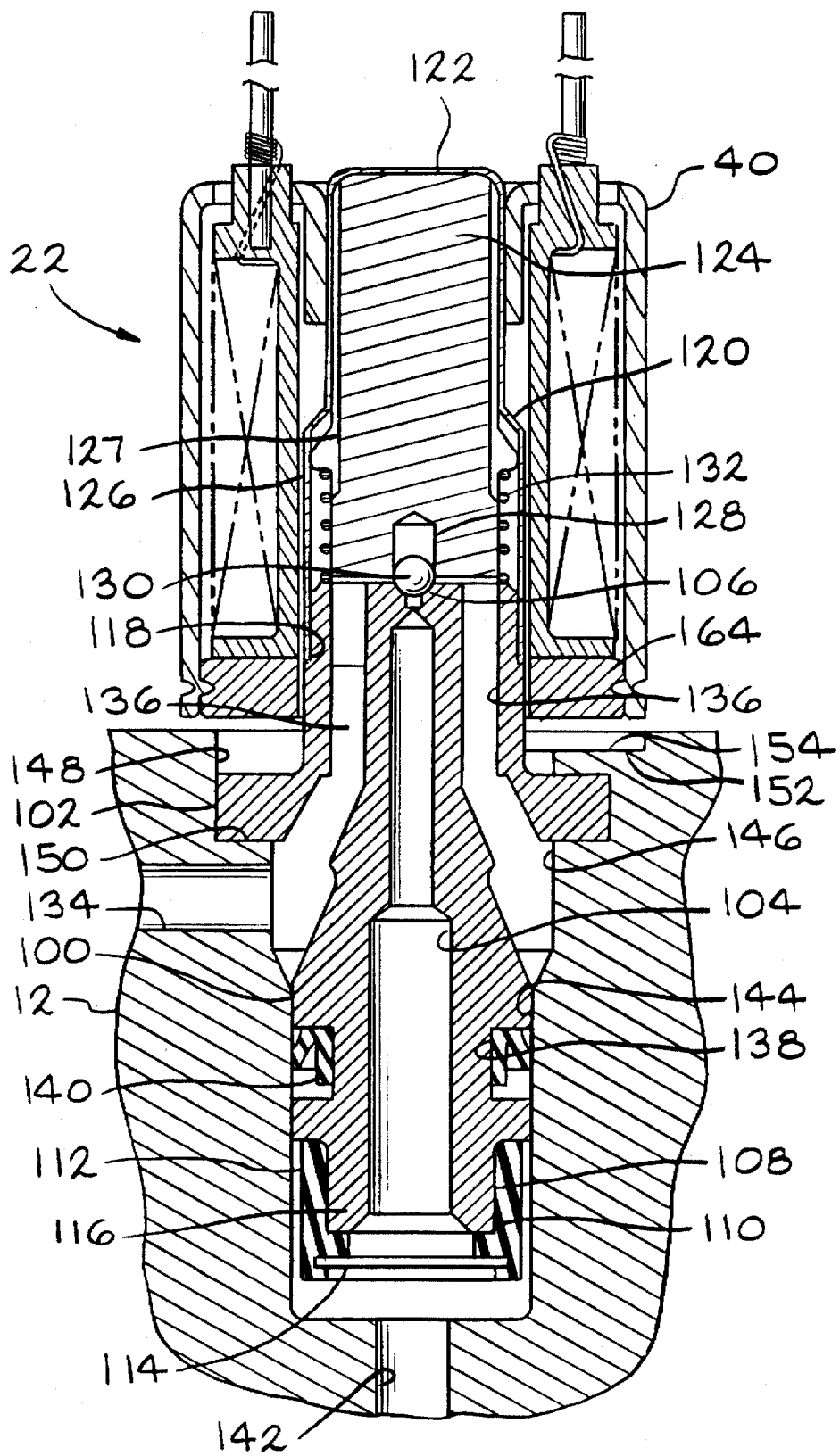
FIG. 6 is a cross-sectional view similar to FIG. 3 of a third embodiment of the present invention, in the form of an isolation valve.
Figure 7:
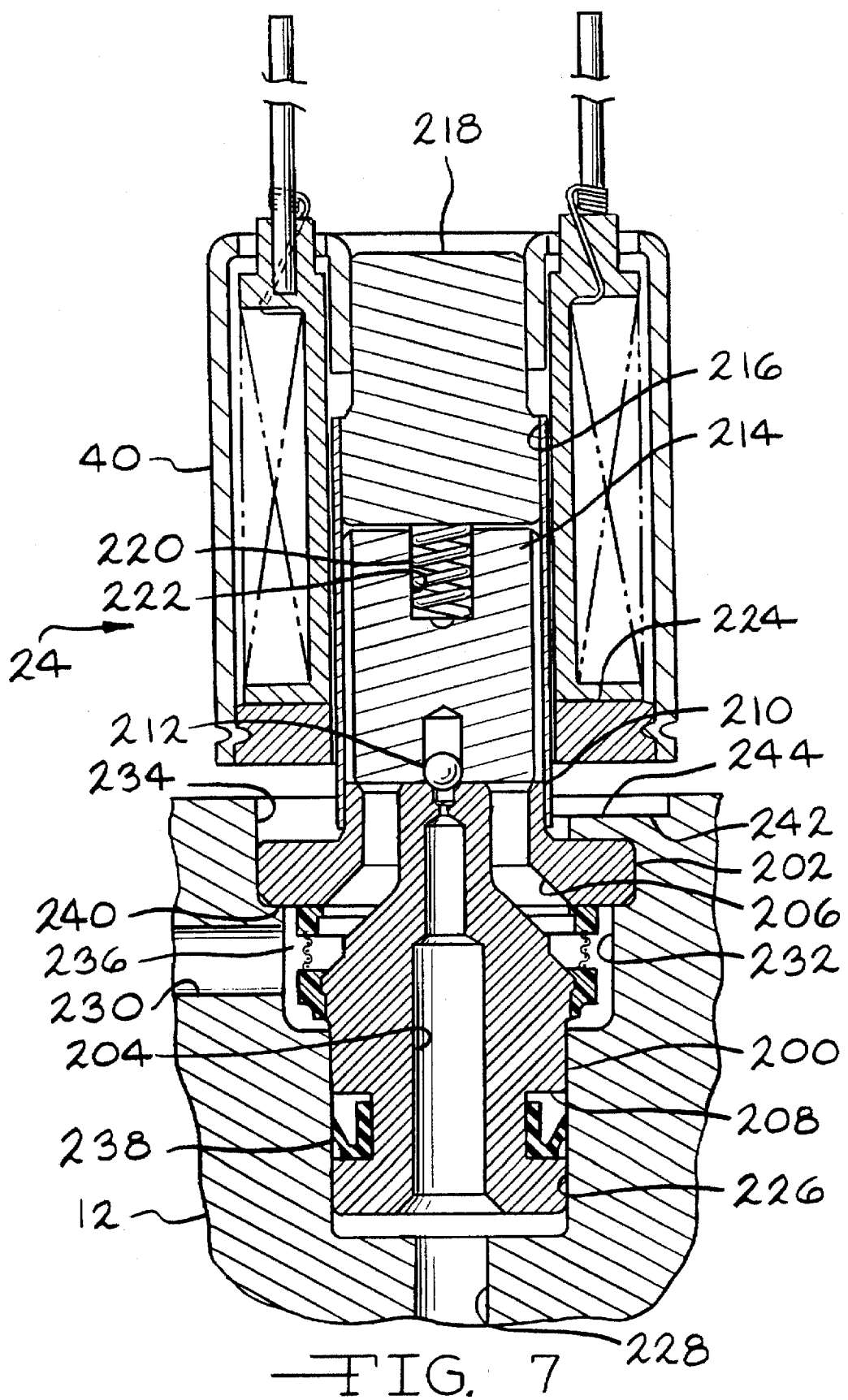
FIG. 7 is a cross-sectional view similar to FIG. 6 and with the embodiment being shown in the form of a hold/dump valve.

A further embodiment of the isolation valve 22 is shown in FIG. 6 and a similar valve presentation as a hold/dump valve 24 is shown in FIG. 7. The structure of the isolation valve 22 and its assembly to the valve body housing 12 are shown in FIG. 6. The isolation valve has a cylindrical valve body 100 having a radial flange 102. The valve body 100 has a coaxial flow passage 104 provided therethrough which terminates at its upper end in a conical valve seat 106. The lower end of the valve body 100 has a reduced diameter portion 108 which has an annular catch 110 adjacent to its lower end. A filter assembly 112 having a filter 114 is received over the reduced diameter portion 108 of the valve body 100. The filter assembly 112 has an internal recess 116 in which the annular catch 110 is received to snap lock the filter assembly 112 to the end of the valve body 100 with the filter 114 covering the lower end of the coaxial flow passage 104. The sleeve 120 has an open end and a closed end 122. The open end is laser welded to the valve body 100 providing a fluid tight seal therebetween. The valve body 100 has a reduced diameter section 118 over which the open end of the cylindrical sleeve 120 is received.

An armature 124 is slidably disposed in the cylindrical sleeve 120. The armature 124 has an annular flange 126 and an axial bore 128 in which is received a valve member sized to engage the valve seat 106 and block the upper end of the coaxial flow passage 104. The valve member is preferably a ball 130. The ball 130 may be a steel ball but preferably is a substantially non-deformable ceramic ball. The ceramic ball may be made from a number of substantially non-deformable materials such as zirconia, silicon carbide, alumina oxide, ruby, sapphire, silicon nitride, carbide materials which are hard, retain their shape and resist wear. A coil spring 132 is disposed between the upper end of the valve body 100 and the flange 126 and resiliently biases the armature 124 away from the valve body 100 and the ball 130 away from the valve seat 106. As indicated, the armature 124 and the flange 126 have trough slots 127 providing a fluid passageway between the flange 126 and the closed end 122 of the cylindrical sleeve 120. The slots 127 prevent a fluid lock-up condition inhibiting the rapid displacement of the armature 124 relative to the valve body 100.

A coil assembly 40 such as previously described coil assembly 34, 36, 38 in FIG. 3 is received over the cylindrical sleeve 120 and is operative, when energized, to produce a magnetic field displacing the armature 124 towards the valve body 100 causing the ball 130 to seat on the valve seat 106. The seating of the ball 130 on the valve seat 106 terminates the fluid flow between the axial fluid passage 104 and an outlet passageway 134 formed in the valve body housing 12 through internal passageways 136 formed in the valve body 100. The outlet fluid passageway 134 is connected to an associated threaded aperture 30 and to the input of the associated hold/dump valve 26. The coil assembly includes an annular flux ring 164 disposed at the end adjacent to the valve body housing 12. The flux ring, such as taught in the parent patent application, Ser. No. 08/198,365, filed on Feb. 18, 1994, now U.S. Pat. No. 5,439,279, issued Aug. 8, 1995, and assigned to the assignee of the present invention, enhances the strength of the magnetic field acting on the armature 124 and reduces the current required to produce a magnetic field having a strength sufficient to displace the armature 124 against the force of spring 132.

As shown in FIG. 6, the flux ring 164 is thick, i.e. it has substantial length along its longitudinal axis, relative to the thickness of coil casing 38. Preferably, its length is 3–5 times that of the casing thickness. In one embodiment the casing is approximately 1 mm thick and the flux ring is 3 mm long. Further, the casing inner diameter is sized to be in close sliding engagement with the periphery of the flux ring, and the casing is crimped to the flux ring as shown. All of this assures intimate contact between the casing and flux ring, thereby precluding any significant air gap between the two, and thereby enhancing the efficiency of the coil and strength of magnetic field.

The valve body 100 further has an annular groove 138 in which is received a one-way seal 140 to prevent a fluid flow from the internal inlet passageway 142 of the valve body housing 30 to the outlet passageway 134. The internal inlet passageway 142 connects to an associated threaded aperture 30, and to the master brake cylinder and to the output of the pump 20 as shown in FIG. 1.

The valve body housing 12 has a valve cavity 144 for each isolation valve 22 and each hold/dump valve 24 to be mounted therein. The lower or bottom end of the valve cavity 144 has an annular recess 146 provided adjacent to the terminal ends of internal passageways 138 and a counterbore 148 in which is received the radial flange 102. Preferably, the diameter of the counterbore 148 is slightly smaller than the diameter of the radial flange 102 producing an interference fit in the radial sealing area of the radial flange 102.

After the radial flange 102 is seated on the shoulder 150 as shown on the left side of FIG. 6, the region 152 of the valve body housing 30 adjacent to the edge of the counterbore 148 is swaged to form a lip 154 over the upper surface of the radial flange 102. The swaged lip 154 locks the valve body 100 in the valve bore 144 of the valve body housing 12 and produces an excellent fluid tight seal between the outer edge of the radial flange and the valve body housing. By "fluid tight" is meant a seal capable of sealing fluid pressure in a working range of 60 to 600 psi with occasional pressure spikes as high as 1200 to 3000 psi.

Preferably, the lip 154 is swaged using a swaging tool orbited in a rosette pattern as taught in copending patent application Ser. No. 08/511,900, filed concurrently herewith and entitled "A Hydraulic Valve Control Unit For Vehicular Anti-Lock Brake And Traction Control Systems", now abandoned in favor of U.S. patent application Ser. No. 08/692, 483, filed Aug. 6, 1996 and titled "Hydraulic Valve Control Unit For Vehicular Anti-Lock Brake And Traction Control Systems". The movement of the swaging tool in the rosette pattern uniformly swages the lip 154 inwardly over the radial flange 102 as shown on the right side of FIG. 6. This swaging process not only secures the valve body in the valve cavity 144 but also produces an excellent fluid tight seal between the radial flange 102 and the valve body housing 12.

The details of the hold/dump valve 24 are shown in FIG. 7. The hold/dump valve 24 has a generally cylindrical valve body 200 having a radial flange 202, a coaxial outlet passage 204, an inlet passage 206 and an annular seal groove 208. The coaxial outlet passage 204 has a conical valve seat 210 provided at its upper end which is engaged by a ball valve 212 attached to an armature 214. The ball 212 may be a steel ball but preferably is a ceramic ball of the same type as ball 130 described earlier.

The armature 214 is slidably received in a cylindrical sleeve 216 sealed at one end to the valve body 200 and sealed at the other end to a cylindrically-shaped stationary pole piece 218. In the preferred embodiment, the sleeve 218 is laser welded to the valve body 200 and the pole piece 218 forming a fluid tight seal therebetween. A coil spring 220 received in a spring bore 222 provided in the armature 214 resiliently biases the armature 214 away from pole piece 218 and biases the ball 212 to engage the valve seat 210. Thus, providing the hold/dump valve 24 with a normally closed state. As would be obvious to those skilled in the art, the spring bore 222 may alternatively be provided in the pole piece 218.

A solenoid coil assembly 40, such as solenoid coil assembly 34, 36, 38 shown in FIGS. 1-3, is received over the pole piece 218 and the sleeve 216 and is operative, when energized, to generate a magnetic field displacing the armature 214 in a direction towards the pole piece 218 disengaging the ball valve 212 from the conical valve seat 210 thus opening a fluid passage from the inlet passage 206 and the coaxial passage 204. The coil assembly includes an annular flux ring 224 to enhance the strength of the magnetic field in the vicinity of the armature 214.

The valve cavity 226 provided in the valve body housing 12 has a generally cylindrical shape. The valve body housing 12 further has at least an internal outlet passageway 228, an inlet passageway 230, an annular recess 232 adjacent to the terminal ends of the inlet passageways 206 and a counterbore 234. The counterbore 234, as shown on the left side of FIG. 7, is sized to receive the radial flange 202 with a loose fit or an interference fit with the rim of the radial flange 202. The rim of the radial flange 202 is constructed as previously described relative to the isolation valve 22. An annular filter 236 is received over the valve body 200 with the same snap-fit construction previously described and covers the terminal ends of the inlet passages 206 and a one-way seal 238 is disposed in the annular seal recess 208 to prevent a fluid flow from the inlet port 232 to the outlet port 228.

After the radial flange 202 is properly seated on the shoulder 240 formed at the bottom of the counter-bore 234, the region 242 of the valve body housing 12 adjacent to the counterbore 234 is swaged to form an annular lip 244 which secures the radial flange 202 to the valve body housing 30.

The design of flange 202 and counterbore 234, and the metal forming technique, are the same as discussed above relative to isolation valve 20.

Figure 8:
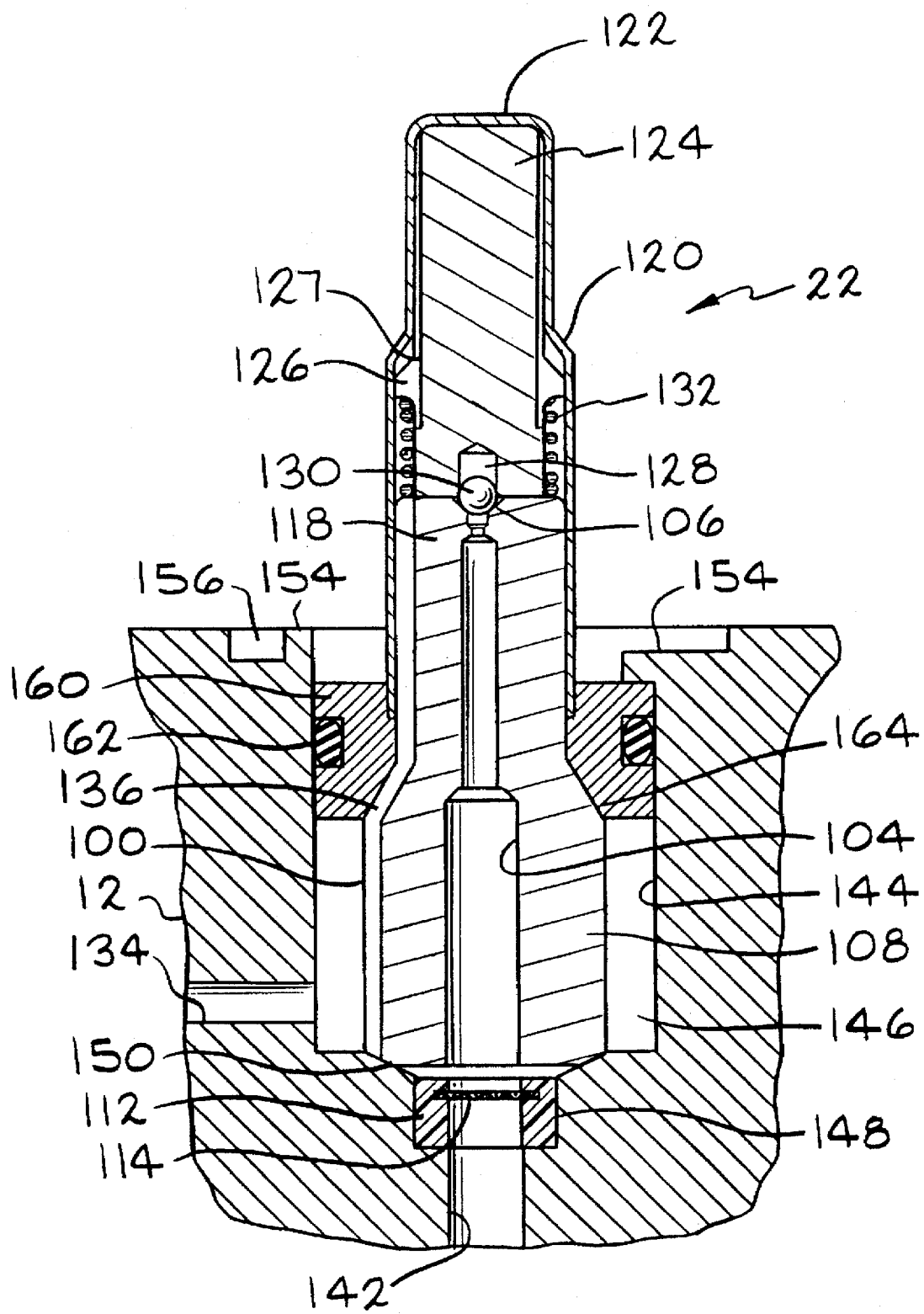
FIG. 8 is a cross-sectional view similar to FIG. 6 of a fourth embodiment of the present invention in the form of an isolation valve.

A further embodiment of the isolation valve 22 and its assembly to the valve body housing 12 is shown in FIG. 8. In comparison with the embodiment of FIG. 6, like reference numerals are used to indicate the features common to both embodiments. The isolation valve 22 has a cylindrical valve body 100. The valve body 100 has a coaxial flow passage 104 provided there-through which terminates at its upper end in a conical valve seat 106. The lower end of the valve body 100 has an enlarged diameter portion 108. A filter assembly 112 having a filter 114 is received within a counter-bored portion of the valve body 100 adjacent inlet passageway 142. The sleeve 120 has an open end and a closed end 122. The open end is laser welded to an annular retainer ring 160, described below, providing a fluid tight seal therebetween. The valve body 100 has a reduced diameter section 118 over which the open end of the cylindrical sleeve 120 and retainer ring 160 is received. The internal passageway 136 (only one being shown is also in the form of a trough slot allowing it to be milled at the outer surface of the valve body. Preferably two or more such passageways will be provided.

An armature 124 is slidably disposed in the cylindrical sleeve 120. The armature 124 has an annular flange 126 and an axial bore 128 in which is received a valve member sized to engage the valve seat 106 and block the upper end of the coaxial flow passage 104. The valve member is preferably a ball 130. The ball 130 may be a steel ball but preferably is a substantially non-deformable ceramic ball as earlier described. A coil spring 132 is disposed between the upper end of the valve body 100 and the flange 126 and resiliently biases the armature 124 away from the valve body 100 and the ball 130 away from the valve seat 106. As indicated, the armature 124 and the flange 126 have trough slots 127 providing a fluid passageway between the flange 126 and the closed end 122 of the cylindrical sleeve 120. The slots 127 prevent a fluid lock-up condition inhibiting the rapid displacement of the armature 124 relative to the valve body 100.

A coil assembly 40(not illustrated in FIG. 8) such as previously described coil assembly 34, 36, 38 in FIG. 6 is received over the cylindrical sleeve 120 and is operative, when energized, to produce a magnetic field displacing the armature 124 towards the valve body 100 causing the ball 130 to seat on the valve seat 106. The seating of the ball 130 on the valve seat 106 terminates the fluid flow between the axial fluid passage 104 and an outlet passageway 134 formed in the valve body housing 12 through the passageways 136 in the valve body 100. The outlet fluid passageway 134 is connected to an associated threaded aperture 30(illustrated only in FIG. 1) and to the input of the associated hold/dump valve 24. The coil assembly 40 is as earlier described regarding FIG. 6.

The internal inlet passageway 142 connects to an associated threaded aperture 30(illustrated only in FIG. 1), and to the master brake cylinder and to the output of the pump 20 as shown in FIG. 1.

The valve body housing 12 has a valve cavity 144 for each isolation valve 22 and each hold/dump valve 24 to be mounted therein. The lower or bottom end of the valve cavity 144 has an annular recess 146 provided adjacent to the terminal ends of internal passageways 136 and a counterbore 148 leading into inlet 142.

The counterbore provides a tapered shoulder 150 which provides a stop for the valve body 100.

An annular retainer ring 160 with attached sleeve 120 is slidably received over the reduced diameter section 118 of the valve body. It includes a compression seal member, such as an O-ring 162, within an annular groove to preclude fluid escaping externally of the cavity 144. The retainer ring also includes a curvilinear, radiused surface 164 mating with an adjacent complementary surface on the valve body, preferably in the form of a truncated conical surface, providing a secondary fluid seal at this interface during the assembly process described below, as well as serving to hold the valve body 100 on shoulder 150. Further, at its other end, the internal bore of the retainer ring 160 is counterbored to receive the open end of sleeve 120 prior to being laser welded thereto. Thus, the internal diameter of the sleeve 120 and minimum diameter of the retainer ring 160 are the same and sized to provide a sliding fit with valve portion 118.

After the valve body 100 is seated on the shoulder 150 and the retainer ring and sleeve assembly 160, 120 is in place as shown on the left side of FIG. 8, the annular lip 154 of the valve body housing 12 adjacent to the edge of the bore 144 is swaged to form a valve retention lip 154 over the upper surface of the radial flange 102. The swaged lip 154 locks the valve body 100 in the valve bore 144 of the valve body housing 12 and produces an excellent fluid tight seal at the shoulder 150 thereby precluding fluid flow from inlet passageway 142 to the outlet passageway 134.

Initially, the annular lip 154 is formed by machining an annular groove 156 in the valve housing 12 concentric with bore 144. During assembly, the lip 154 is preferably cone swaged using a swaging tool as taught in U.S. Pat. No. 5,364,067, assigned to the assignee of the present invention and being incorporated herein by reference as a teaching of the process.

A hold/dump valve such as valve 24 shown in FIG. 7 could be constructed and retained in the housing in the same manner.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

What is claimed is:

1. A vehicle anti-lock brake control unit comprising a housing having a plurality of solenoid actuated hydraulic control valves non-threadedly secured in relative fixed axial position within a respective control valve bore therein and extending from a common wall of the housing;

each control valve including a valve body, a valve stem concentrically aligned with the valve body and non-threadedly secured thereto in fixed relative axial position, said valve stem including an axially extending flow passage therethrough open at each end thereof, an armature concentrically aligned with said valve stem and operatively coupled with said valve stem to control fluid flow through said flow passage when activated by a coil, and a cylindrical sleeve surrounding said armature and secured to said valve body;

said sleeve and enclosed armature projecting beyond said housing common wall;

said control unit including an electrical control module including a plurality of individual cylindrical coils received within a respective electrically conductive casing; and each respective casing and coil subassembly including an integral flux ring and being slidably received over a respective one of said control valve sleeves, whereby the electrical control module may be connected and disconnected as a unit from the housing.

2. The anti-lock brake control unit of claim 1 wherein each said valve body includes an outer diameter no greater than the outer diameter of the coil such that minimum spacing between multiple control valves in the control unit is not limited solely by the outer diameter of the valve body.

3. The anti-lock brake control unit of claim 2 wherein the casing, flux ring and valve body are constructed from a ferrous material.

4. The anti-lock brake control unit of claim 1 wherein each said valve body includes an inner end seated within said control valve bore and an outer end projecting beyond said common wall of the housing; and a flux ring slidably received upon said outer end and being received within said casing.

5. The anti-lock brake control unit of claim 4 wherein the outer diameter of the valve body is reduced at the outer end of the valve body, the outer end of the valve body adapted to receive the flux ring, the flux ring having an outer diameter no greater than the outer diameter of the coil.

6. The anti-lock brake control unit of claim 5 wherein the maximum outer diameter of the valve body is no greater than the outer diameter of the flux ring, coil and casing.

7. In combination, a control valve and a vehicle anti-lock brake system control unit having a housing with a control valve bore therein, the control valve comprising:

a cylindrical, relatively thin metal sleeve having a moveable armature therein;

a coil assembly surrounding the sleeve for moving the armature, the coil assembly including a cylindrical electromagnetic coil surrounding said sleeve, a cylindrical casing surrounding said coil, and a cylindrical electrically conductive flux ring having a concentrically located central bore and surrounded by said casing and secured to said casing at one end thereof, said flux ring having an inner diameter defining said central bore and an outer diameter defining the radially outward limit of the flux ring, a cylindrical valve body assembly having an inner end and an outer end, the outer end attached to the sleeve and the inner end seated within the control valve bore of the housing;

said sleeve being secured to the valve body assembly at said outer end;

an electrical control module attached to the coil, the control module, casing, coil and flux ring together forming a sub-assembly, the sub-assembly being placed over the sleeve and the outer end of the valve body after the inner end of the valve body is seated within the control valve bore of the housing;

said sub-assembly being received on said sleeve with said flux ring at said inner diameter being in at least near sliding engagement with said sleeve and being positioned at the outer end of said valve body assembly whereby magnetic flux occurring upon energization of said coil is caused to pass through said flux ring and is confined to the outer end of said valve body assembly.

8. A valve mountable in a valve housing having a valve cavity and a counterbore forming a flange shoulder comprising:

a cylindrical valve body receivable in the valve cavity, said valve body having a first end, an opposite end and a radial flange intermediate said first and opposite ends receivable in said counterbore and seatable on said flange shoulder;

a concentric fluid passageway provided in said valve body extending from said first end to said opposite end, said concentric fluid passageway having a valve seat provided adjacent to said first end;

an offset passageway provided in said valve body extending from said first end at a location radially offset from said concentric fluid passageway and exiting said valve body at a location intermediate said radial flange and said opposite end;

a cylindrical sleeve having a closed end, said cylindrical sleeve sealingly attached to said first end of said valve body and extending concentrically therefrom;

an armature slidably disposed in said cylindrical sleeve;

means for biasing said armature relative to said valve body; and a ball valve attached to said armature in alignment with said valve seat, said ball valve blocking a fluid flow in said concentric fluid passageway when said ball valve is engaged with said valve seat;

said ball valve being a non-deformable ceramic material.

9. The valve of claim 8 wherein said non-deformable ceramic material is selected from a group of ceramic materials consisting of zirconia, silicon carbide, alumina oxide, ruby, sapphire and silicon nitride.

* * * * *